May 30, 1944.　　　E. C. HORTON ET AL　　　2,350,040
PRECISION INSTRUMENT
Filed Oct. 5, 1942　　　2 Sheets-Sheet 2

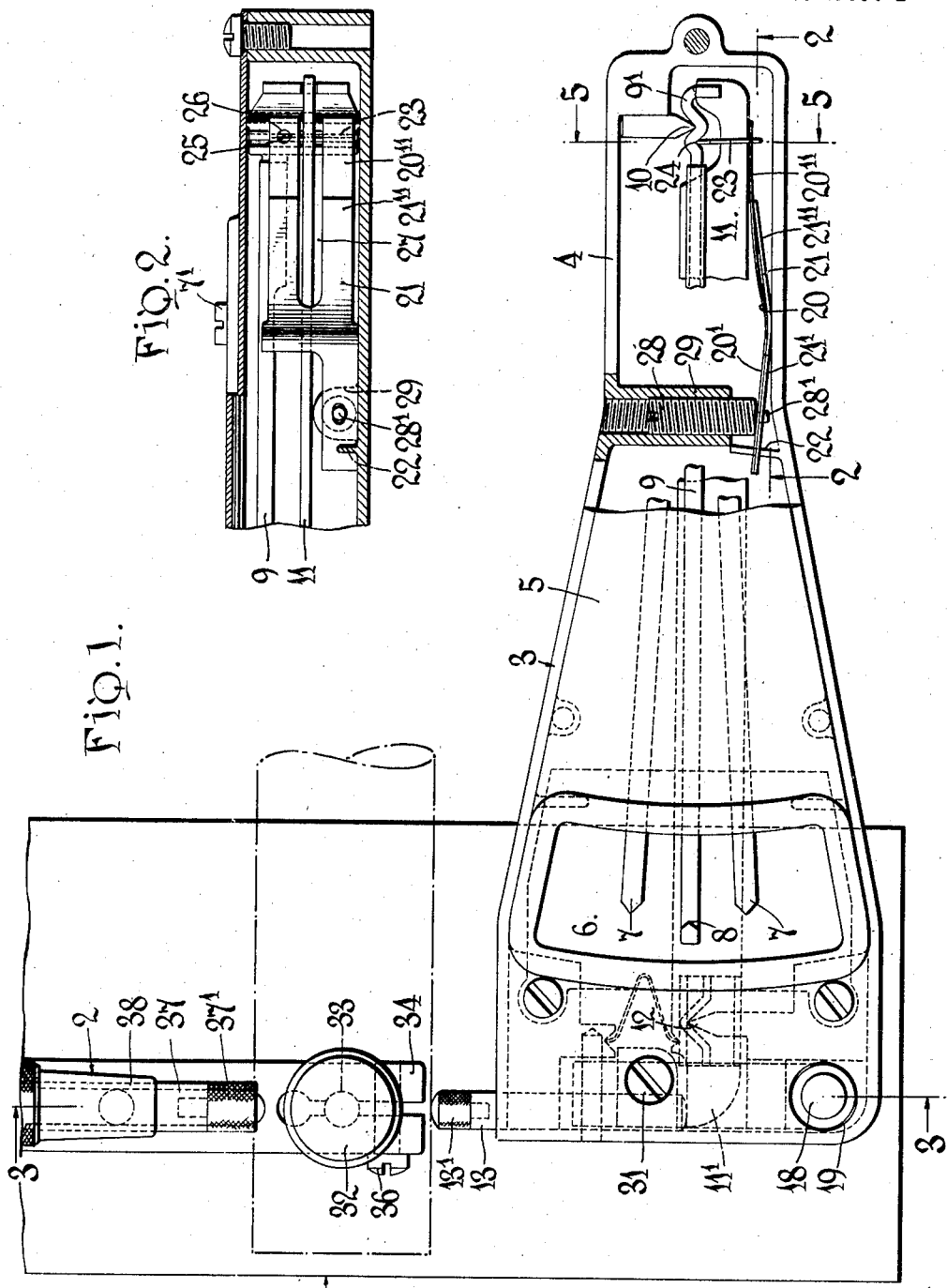

INVENTORS
ERWIN C. HORTON &
ANTON RAPPL
BY
Beau, Brooks, Buckley & Beau.
ATTORNEYS Patented May 30, 1944

2,350,040

UNITED STATES PATENT OFFICE 2,350,040

PRECISION INSTRUMENT

Erwin C. Horton, Hamburg, and Anton Rappl, Buffalo, N. Y., assignors to Trico Products Corporation, Buffalo, N. Y.

Application October 5, 1942, Serial No. 460,752

14 Claims. (Cl. 33—147)

This invention relates to a precision instrument for the gaging and comparative inspection of mechanical parts, the same being an improvement on our application filed May 4, 1942, under Serial No. 441,614, wherein is disclosed a micrometer type of gage for utilizing the amplifying effect of a system of levers in making readings by a comparative testing of work pieces from a setting made from a master part. When used as a comparing device a manual control is provided to retract the gaging plunger which may be rendered inoperative by suitable means to adapt the instrument for use as a snap gaging instrument. For snap gaging operations, the gaging plunger must be forced back against its actuating spring pressure by the work piece which is pressed in from the side. Consequently, a light spring pressure is desirable here in contrast to the more desired heavier spring pressure for the manually controlled plunger.

The object of the present invention is to provide a practical precision instrument of this character by which the greatest efficiency is secured from its use in both gaging operations.

The invention further has for its object to provide an indicating gage of this character having greater flexibility and adjustment for widespread use in present machine shop practice and mass production methods.

In the drawings:

Fig. 1 is a plan view of the improved precision instrument with portions being removed or broken away;

Fig. 2 is a fragmentary vertical sectional view about on line 2—2 of Fig. 1;

Figure 3:
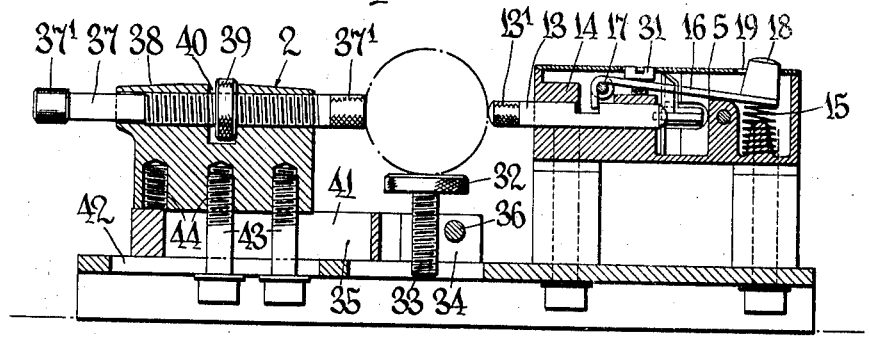
Fig. 3 is a transverse sectional view about on line 3—3 of Fig. 1.
Figure 4:
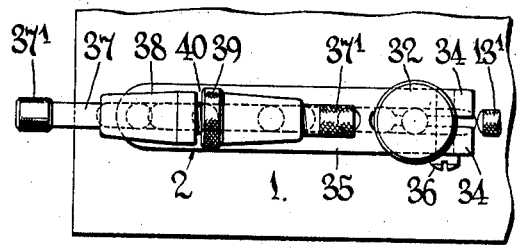
Fig. 4 is a plan view of the adjustable anvil.
Figure 5:
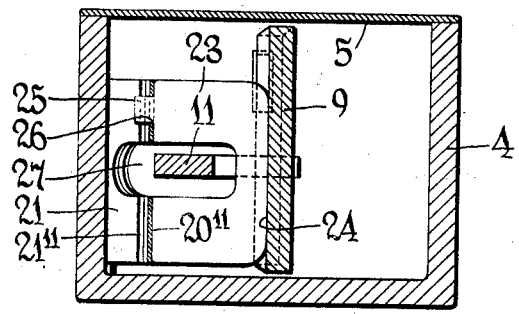
Fig. 5 is a transverse sectional view about on line 5—5 of Fig. 1.

Referring more particularly to the drawings, the numeral 1 designates the supporting base on which is arranged an adjustable anvil 2 and an indicating gage unit 3. The gaging unit comprises a box-like housing 4 having a removable cover plate 5 with a window 6 in which are adjustably disposed the tolerance limit indicators 7 adapted to be set by turning their mounts 7' in the cover plate 5. The gage pointer 8 is formed on the free end of a secondary lever 9 having fulcrum support on a knife edge 10 with its shorter arm 9' bearing upon the longer arm of a primary lever 11 which in turn is supported on a knife edge bearing 12 and has its shorter arm 11' resting upon the inner end of a work contacting plunger 13. This plunger is slidably mounted in a bearing block 14 at one end of the housing 4 in opposition to the anvil 2 and is held normally retracted by a spring 15 acting through a bell crank lever 16 mounted at 17. The bell crank lever carries a button 18 which is accessible through an opening 19 in the cover plate 5 and is adapted to be depressed against the spring 15 to release the plunger for gaging purposes.

The plunger is energized or urged against the work piece by a spring 20 which may be in the form of a flat or leaf spring supported nestingly in a cradle 21. This cradle is rockably mounted on a side wall of the box-like casing 4 and has angularly related arms 21' and 21'' upon which the spring of like shape is adapted to lie flat. The spring arm 20' is substantially coextensive in length with the supporting cradle arm 21' and both of these relatively superimposed arms are formed with registering notches to guidingly receive a rib 22 upstanding from the bottom of the box. The rib therefore holds the spring and its cradle in assembled nesting relation for rocking as a unit on the elbow or bend as a point of fulcrum support.

The spring arm 20'' is longer than the arm 20' and overhangs the free end of the cradle arm 21'' to provide a resilient cantilever support for a strut or link 23 that is interposed between the spring arm and the secondary lever 9 to urge the latter clockwise as viewed in Fig. 1. The tying link, being illustrated in the form of a thin flat leaf, bears in a seat 24 in the primary lever adjacent the knife edge bearing 10 at the pointer side and is retained in place by a positioning lug 25 engaging in a hole 26 in the spring arm. The arms 20'' and 21'' and the link 23 have their adjoining portions cut away, as at 27, to straddle freely the primary lever 11 for efficient operation of the parts.

To adjust the sensitivity of the spring arm 20'' a pressure regulating screw 28 is threaded in a boss 29 or bearing on the composite arm structure 20', 21'. This screw is accessible from without and has a pin extension 28' engaged in a recess 30 in the arm structure for cooperating with the rib 22 in holding the spring operative at all times. By adjusting the screw the spring pressure on the gaging plunger may be regulated lightly, say to two or three ounces, for snap gage use, or, by increasing the flexure of the spring arm 20'', the spring pressure may be augmented to two or more pounds for hand controlled gaging operation.

In operation, the work piece may be inserted between the anvil 2 and the gaging plunger, which latter may have a replaceable tip 13' adapted to the particular operation. For snap gage use the plunger will be freed of its bell crank lever by locking the latter depressed, as by driving down a lever depressing lock screw 31, the location of the work piece being determined by the height of a work table 32 which as an adjustable standard 33 threaded between resilient jaws 34 of a mounting base 35. These jaws are adapted to be tightened by a clamp screw 36 for securing a given adjustment.

The anvil 2 comprises a spindle 37 which is threaded in a headstock 38 and retained in an adjusted position by a jam nut 39 located in a slot 40. The headstock 38 is mounted on the table mounting base 35 which has a slot 41 in registry with a slot 42 in the base plate 1. A pair of headed locking screws 43 are passed upwardly through the slots 41 and 42 and threaded in a selected two of the three holes 44 formed in the lower portion of the stock 38, this selection enabling a greater adjustment of the stock should any one of the holes be obstructed by overlying ends of the slots 41 and 42, as is the left hole in Fig. 3. For odd sizes of work pieces one of the bolts 43 may be removed and the headstock with its mounting base 35 swung about the other bolt as a pivot to present the opposite end of the spindle to the work piece. Consequently, the anvil is adjustable by reason of the threaded spindle 37. It is also bodily adjustable through the bolt and slot arrangement. Furthermore, it is reversible to dispose the work table 32 out of the way. This adjustment enables the proper placement of the anvil to insure the work piece being engaged by the gaging plunger when released by the retractor. The spindle may have tips 37', thereby enabling the use of tips of different designs for various jobs, such as when gaging the base of threads or grooves in the work piece.

While the foregoing description has been given in detail, the disclosure has been made as merely illustrative of the inventive principles involved which latter are capable of assuming other physical embodiments without departing from the scope or spirit of the invention claimed.

What is claimed is:

1. An indicating gage comprising an anvil, a work engaging plunger arranged in opposition thereto, means movably supporting the plunger for movement toward and from the anvil, a primary lever acting at one end on the plunger, a pointer in the form of a secondary lever bearing on the opposite end of the primary lever, resilient means acting on the primary lever in a manner to hold said opposite end on the secondary lever, spring means acting on the secondary lever and through the primary lever to urge the plunger into work engaging position in opposition to and in domination of said resilient means, means for adjusting the tension of said spring means to regulate the urge on the plunger for light or heavy pressure contact with the workpiece, a retractor operable to withdraw the plunger against the action of said spring means, resilient means acting on said retractor to normally hold the plunger retracted against the urge of said spring means, and means for rendering the retractor inoperative whereby the plunger is free of manual control for snap gaging operation.

2. An indicating gage comprising an anvil, a manually retractible work engaging plunger arranged in opposition thereto, means movably supporting the plunger for movement toward and from the anvil, a primary lever acting at one end on the plunger, a secondary lever bearing on the opposite end of the primary lever and carrying a pointer, a spring acting on the secondary lever and through the primary lever to urge the plunger into a work engaging position, resilient means dominated by said spring and acting upon the primary lever to hold its opposite end on the secondary lever, means normally acting to retract the plunger and operable to release the latter against an inserted workpiece, means operable to secure the retracting means inoperative whereby a workpiece may be pressed between the plunger and anvil for snap gaging, and means for adjusting the spring to provide a light urge on the plunger for snap gage use or to provide a relatively heavier urge on the plunger for a firmer contact with the work piece when the retracting means are used.

3. An indicating gage comprising an anvil, a work engaging plunger arranged in opposition thereto, means movably supporting the plunger for movement toward and from the anvil, a primary lever acting at one end on the plunger, a secondary lever bearing on the opposite end of the primary lever and operable to give an indication, spring means acting on the secondary lever and through the primary lever to urge the plunger into a work engaging position, means for adjusting the tension of said spring to regulate its urge on the plunger, and spring actuated means acting normally to retract the plunger against the action of said spring means in all tensional adjustments, said retracting means being manually releasable.

4. A gage comprising an anvil, a plunger opposing the same, means mounting the plunger for movement toward and from the anvil, an indicator, movement amplifying means operatively connecting the plunger to the indicator and including a lever, a flat spring, a rockable support for the spring, the spring overhanging the support at one end, means connecting the overhanging end portion of the spring to the lever to provide a resilient cantilever action, and means for adjustably rocking the support to modify the deflection and thereby the tension of the overhanging spring portion.

5. A gage comprising an anvil, a plunger opposing the same, means mounting the plunger for movement toward and from the anvil, an indicator, movement amplifying leverage operatively connecting the plunger to the indicator and including a lever, a flat spring, a cradle having angularly related arms, said flat spring having angularly related portions adapted to nest in the cradle with one of said portions overhanging the cradle to provide resilient cantilever support for the lever, the opposite portion of the spring and its supporting cradle arm guidingly engaging a part of the casing for holding the spring and its cradle operative, and means for adjusting the cradle to vary the deflection of the overhanging portion.

6. A gage comprising an anvil, a plunger opposing the same, means mounting the plunger for movement toward and from the anvil, an indicator, movement amplifying means operatively connecting the plunger to the indicator and including a lever, a flat spring, a cradle having angularly related arms, said flat spring having angularly related portions adapted to nest into the cradle with one of said portions overhanging the cradle to provide resilient support for the lever, the opposite portion of the spring and its supporting cradle arm guidingly engaging a part of the casing for holding the spring and its cradle operative, and means engaging said spring and its cradle for tensioning the overhanging portion of the spring.

7. A combined snap gage and manually set gage comprising a work engaging plunger, a box-like housing having a bearing in which the plunger is slidably mounted, a primary lever acting at one end on the plunger, a secondary lever having one end portion operatively connected to the primary lever, a knife edge support for the secondary lever, a pressure regulating spring for the plunger acting on the secondary lever in opposition to and at one side of the knife edge support for holding the secondary lever on the latter and additionally acting through the levers for urging the plunger to its work engaging position, and means for adjusting the pressure of said spring to vary the sensitivity of the plunger in contacting a work piece when used either as a snap gage or as a manually set gage.

8. An indicating gage comprising a work engaging member, means movably mounting the member, indicating means operable by the member and including a lever, a knife edge support for the lever, a pressure regulating spring acting on the lever in opposition to and at one side of the knife edge support for urging the member to its work engaging position, means for adjusting the pressure of said spring, said spring being in the form of a resilient leaf, means pivotally supporting the leaf between its ends to provide oppositely extending arms, one of said arms being connected to said lever for so acting as aforesaid, and means adjustably engaging the opposite end of the spring to rock the same and thereby tension the first arm.

9. An indicating gage comprising a work engaging member, means movably mounting the same, indicating means operatively connected to the plunger and including a lever, a knife edge support for the lever, a pressure regulating means acting on the lever, said pressure regulating means being in the form of a spring having angularly extending arms and rockably supported at the included angle upon said mounting means, means guidingly supporting one of said arms, means engaging said one arm to adjustably rock the spring and thereby tension the other arm, and means connecting the latter arm to the lever in opposition to and at one side of the knife edge support for urging the member to its work engaging position.

10. An indicating gage comprising a work engaging plunger, an anvil arranged in opposition to the plunger, said anvil comprising a spindle, an adjustable support for the spindle enabling bodily adjustment of the latter, said spindle being mounted on its support for individual adjustment, and a work table adjustably interposed between the spindle and the plunger.

11. An indicating gage comprising a base, a work engaging plunger slidable thereon, an anvil arranged on the base in opposition to the plunger, a work table, a mount for the table adjustable on the base, a headstock adjustably supported on said mount, a spindle adjustably supported on the headstock, and common means securing the headstock and mount in their adjusted position on the base.

12. An indicating gage comprising a base, a work engaging plunger slidable thereon, an anvil arranged on the base in opposition to the plunger, a work table, a mount for the table adjustable on the base, a headstock adjustably supported on said mount, a spindle adjustably supported on the headstock, and means for securing the headstock and mount as a unit in an adjusted position on the base, said securing means acting when inoperative as a pivotal support for the unit to permit the spindle being reversed with respect to the plunger.

13. An indicating gage comprising a base, a work engaging plunger slidable thereon, an anvil arranged on the base in opposition to the plunger, a work table, a mount for the table adjustable on the base, a headstock adjustably supported on said mount, a spindle adjustably supported on the headstock, and means for securing the headstock and mount as a unit in an adjusted position on the base, said securing means acting when inoperative as a pivotal support for the unit to permit the spindle being reversed with respect to the plunger, said plunger having a replaceable tip and each end of the spindle being provided with a replaceable tip.

14. In an indicating gage, a supporting base, a head slidably and reversibly adjustable thereon, a spindle adjustable on the head, a work table, a mount adjustably supporting the work table adjacent the spindle, said mount being interposed between the head and the base, and means common to both the head and the mount for securing the two in a set adjustment on the base.

ERWIN C. HORTON.
ANTON RAPPL.